Figure 1:
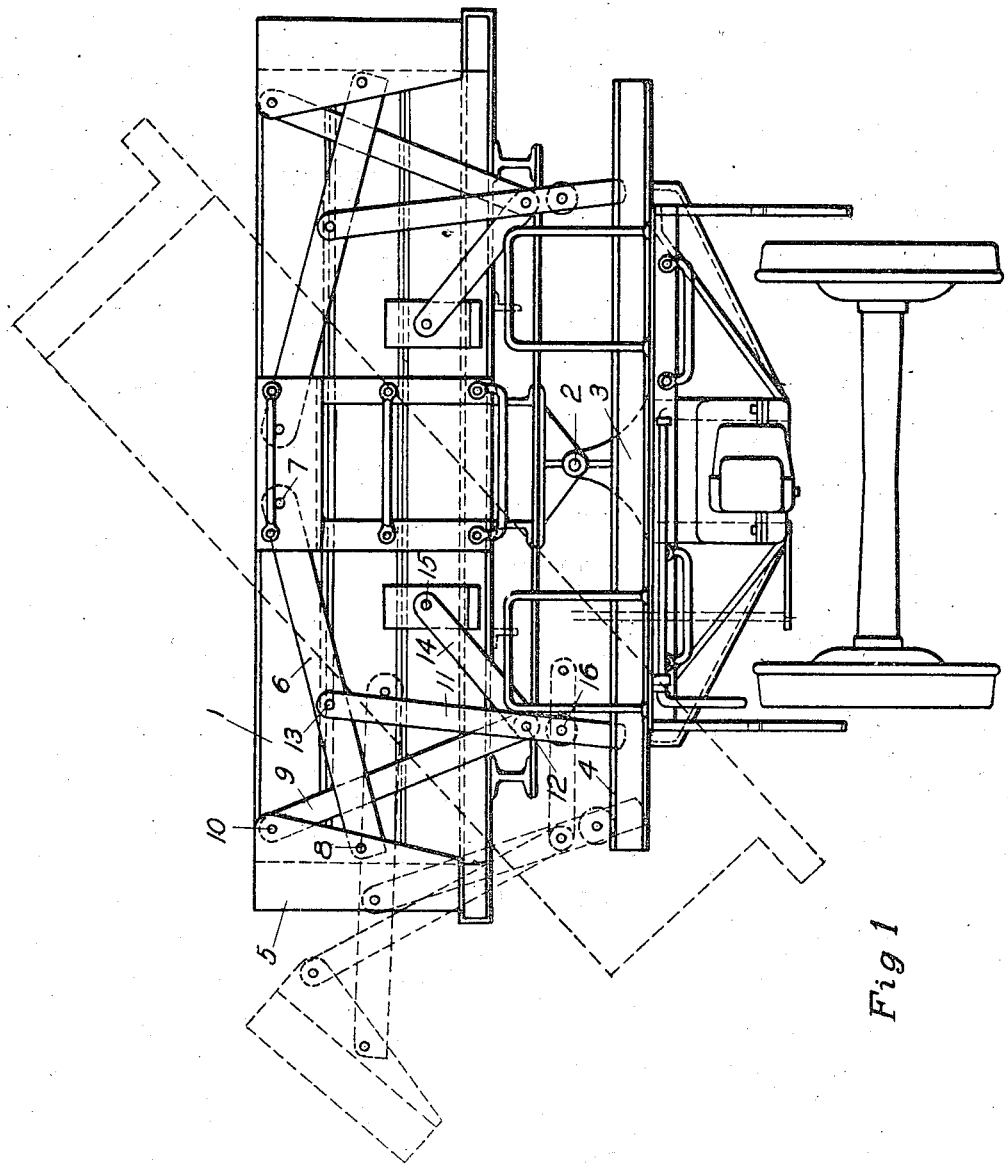

W. L. BURNER.
DUMP CAR.
APPLICATION FILED MAR. 23, 1918.

1,281,508. Patented Oct. 15, 1918.

WITNESSES:
O. E. Williams

INVENTOR.
William L. Burner
BY
Geo W Rightmire ATTORNEYS.

UNITED STATES PATENT OFFICE.

WILLIAM L. BURNER, OF COLUMBUS, OHIO, ASSIGNOR TO KILBOURNE AND JACOBS MANUFACTURING COMPANY, OF COLUMBUS, OHIO, A CORPORATION OF OHIO.

DUMP-CAR.

1,281,508.  Specification of Letters Patent.  Patented Oct. 15, 1918.

Application filed March 23, 1918. Serial No. 224,181.

*To all whom it may concern:*

Be it known that I, WILLIAM L. BURNER, a citizen of the United States, residing at Columbus, in the county of Franklin and State of Ohio, have invented certain new and useful Improvements in Dump-Cars, of which the following is a specification.

My invention relates to improvements in dump cars and comprises door operating mechanism especially applicable to cars having displaceable sides; my devices not only hold the door aloft as the car bed is being dumped and righted, but also have a lateral travel imparted thereto to effect a quick and wide opening between the door and the car bed. The peculiar arrangement of supporting bars and other operating bars will be pointed out in detail later.

In the drawing which is hereto attached and hereby made a part of the specification an end view of a car is presented having a car bed 1 pivotally mounted at 2 to permit lateral dumping, on the underframe 3; on said underframe disposed transversely thereof is the track or guide 4 for supporting the dumping devices and providing a guide for the latter in their movements during the dumping operation.

The door 5 extending as usual the length of the car is supported by the bar 6 pivotally connected with the car bed near the middle point of the upper edge thereof at 7, and bar 6 is pivotally connected to the door at a point 8 about half way between the upper and lower edges thereof. A second bar 9 is pivotally connected with the door at 10, a point near the upper edge thereof, and at its lower end said bar 9 is pivoted on a vertical bar 11 at 12, said bar 11 being pivotally connected at its upper end with bar 6 at a point 13 near the middle point longitudinally but between said middle point and the door.

At 12 also is pivotally connected with vertical bar 11 and door supporting bar 9 a thrust member or bar 14 which at its other end is pivotally mounted on the car bed at 15. Disposed on bar 11 toward the lower end thereof is a roller or wheel 16 adapted to engage the track member 4 as the car bed is being tilted, and to act thereupon and thereafter during the tilting and righting operations as a prop for the door supporting mechanisms.

As the car bed is tilted, as appears in the figure in the dotted lines, the car bed, door, and door operating mechanism travel as an integral structure until the roller 16 contacts with the track 4, whereupon the bar 11 through the pivotal connections 12, 13 prevents a further descent of the door supporting members 6, 9. The door is thereby maintained at about the altitude thus reached and as the car bed continues to descend the whole door supporting structure is given a thrust outwardly by the bar 14 approaching a horizontal position and as a result the whole structure moves laterally carrying the door away from the car bed through a distance determined by the lengths of the bar members 6, 14. In this position of the parts the bars 6, 14 are practically in horizontal parallelism, while supporting bar 11 has been brought almost into vertical coincidence with supporting bar 9.

The bar 11 at the instant of contact of the roller 16 with the track 4 is so positioned as to be practically on the diagonal line of the quadrilateral two sides of which are provided by the bars 9, 14 and is therefore capable most effectively to exert a lifting force on the door through the bar members 6, 9, and while the upper end of the bar 11 at 13 is being thrust outwardly by the bar 6 which is carried outwardly by the rotation of the car bed, the lower end is also being thrust outwardly by the bar 14 engaging therewith at 12. When the car bed is being righted the door supporting structure described is drawn back by its connection therewith and the door is thereby restored to its normal closed position. It will be noted that the roller provision and the interconnection among the bars used in this mechanism produce a construction in which the strains set up will be at a minimum and will be supported and distributed most effectively.

What I claim is:—

1. In a dump car having a displaceable side door a supporting bar for said door pivotally associated with the car bed, a second supporting bar for said door, a prop member, a thrust member pivotally mounted on the car bed, and a pivotal connection between said prop member and said thrust member and said second supporting bar, and a pivotal connection between said prop member and said first mentioned supporting bar.

2. In a dump car having a displaceable side door a supporting bar for said door pivotally associated with the car bed; a second supporting bar for said door, a prop member, a thrust member pivotally mounted on the car bed, and a pivotal connection between said second supporting bar and said prop member and said thrust member, and a pivotal connection between said prop member and said first mentioned supporting bar, a guide on said car and a roller or bearing member on said prop adapted to engage with and travel upon said guide as said prop is actuated by said thrust member as said car bed is being lowered to a dumping position and being righted.

In testimony whereof I affix my signature in the presence of two witnesses.

WILLIAM L. BURNER.

Witnesses:
F. HEATON,
R. SEWELL.